United States Patent
Rutz

[11] Patent Number: 5,933,930
[45] Date of Patent: Aug. 10, 1999

[54] GUIDE RAIL FOR TENTER CLAMPS IN TENTERING MACHINES, ESPECIALLY FILM STRETCHING MACHINES

[75] Inventor: Andreas Rutz, Lindau, Germany

[73] Assignee: Lindauer Dornier Gesellschaft mbH, Lindau, Germany

[21] Appl. No.: 09/033,390

[22] Filed: Mar. 2, 1998

[30] Foreign Application Priority Data

Mar. 3, 1997 [DE] Germany ............................ 197 08 620

[51] Int. Cl.⁶ .................................................. D06C 3/00
[52] U.S. Cl. ...................................... 26/89; 26/93
[58] Field of Search ................................. 26/87, 88, 89, 26/93, 91, 72, 73, 98; 226/170, 173

[56] References Cited

U.S. PATENT DOCUMENTS

| | | | |
|---|---|---|---|
| 3,457,608 | 7/1969 | Gageur | 26/93 |
| 3,469,291 | 9/1969 | Gageur | 26/93 |
| 3,638,289 | 2/1972 | Dornier et al. | 26/93 |
| 4,080,692 | 3/1978 | Parrillo et al. | |
| 4,639,984 | 2/1987 | Langer | 26/94 |
| 4,736,498 | 4/1988 | Langer et al. | |
| 5,161,674 | 11/1992 | Rutz et al. | |
| 5,341,547 | 8/1994 | Rutz | |
| 5,367,753 | 11/1994 | Mueller | |
| 5,390,398 | 2/1995 | Rutz et al. | |
| 5,613,284 | 3/1997 | Hosmer | 26/89 |
| 5,768,755 | 6/1998 | Hemmerich | 26/89 |

FOREIGN PATENT DOCUMENTS

| | | |
|---|---|---|
| 2360335 | 6/1975 | Germany . |
| 2558765 | 3/1977 | Germany . |
| 195 15 036 | 10/1996 | Germany . |
| 297 07 124 U | 7/1997 | Germany . |
| 1136709 | 6/1967 | United Kingdom . |
| 2065186 | 6/1981 | United Kingdom . |

*Primary Examiner*—Amy B. Vanatta
*Attorney, Agent, or Firm*—W. F. Fasse; W. G. Fasse

[57] ABSTRACT

A guide rail for supporting the guide rollers of tenter clamps, in a tentering machine such as a film stretching machine, includes a plurality of spring steel bands clamped to a support member of the tentering machine by a clamping block and clamping bolt. To ensure that the guide rollers remain constantly in contact with the guide rail, the guide rail is elastically yieldable in the thickness direction to compensate for any tolerances or deviations in the arrangement or running operation of the guide rollers. At least one of the spring steel bands of the guide rail is spring-elastically deflectable in a thickness direction perpendicular to the lengthwise extension of the guide rail. In one embodiment, at least one of the spring steel bands is pre-curved to provide the necessary elastic spring characteristic. In another embodiment, a spacer member is arranged between initially flat spring steel bands to leave elastically deflectable free edge portions of the steel bands protruding beyond the spacer member and the clamping members. The guide rollers are mounted on the guide rail so as to partially pre-stress the elastically deflectable steel bands in the thickness direction.

26 Claims, 5 Drawing Sheets

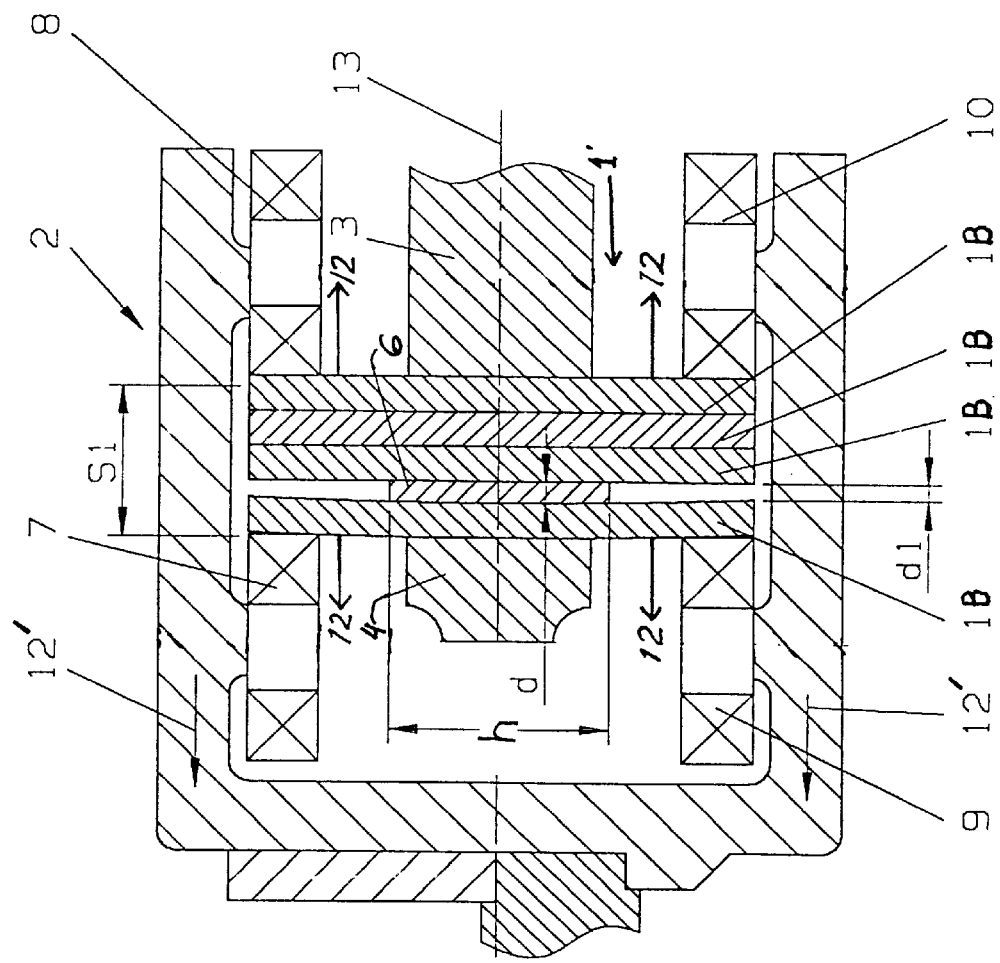
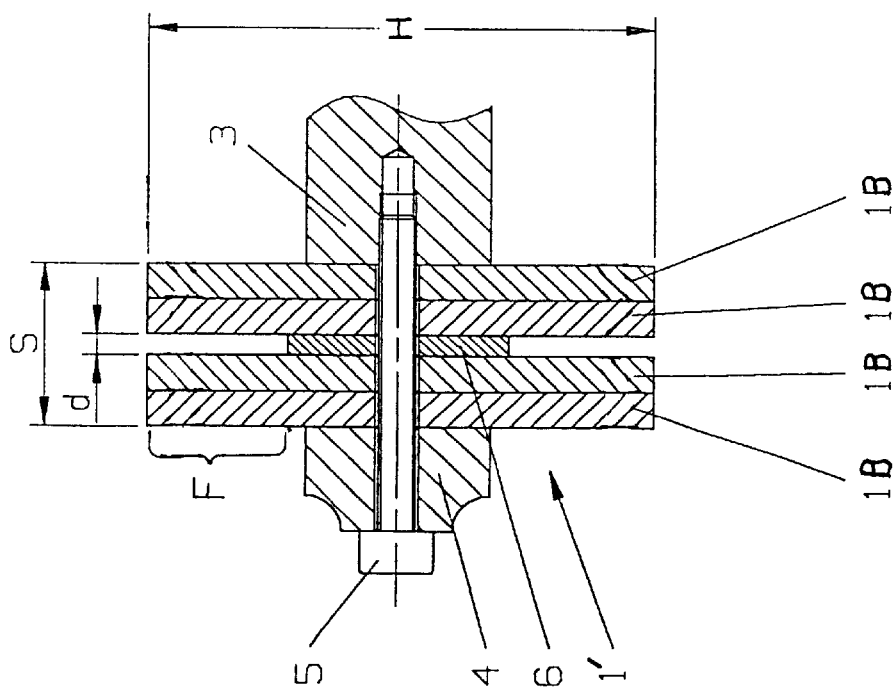

GUIDE RAIL FOR TENTER CLAMPS IN TENTERING MACHINES, ESPECIALLY FILM STRETCHING MACHINES

PRIORITY CLAIM

This application is based on and claims the priority under 35 U.S.C. §119 of German Patent Application 197 08 620.9, filed on Mar. 3, 1997.

1. Field of the Invention

The invention relates to a guide rail for guiding the guide rollers of tenter clamps, clips or hooks in tentering machines, and especially in film stretching machines. The invention especially relates to a guide rail embodied in such a manner that it achieves a constant rolling contact of all guide rollers on the guide rail.

2. Background Information

In order to continuously process a web of textile or film or the like, and especially to continuously stretch a web of film in two bi-axial directions, it is known to use a film stretching machine including tenter clamps, clips or hooks that are mounted and conveyed on tenter chains and that are guided along guide rails. The tenter clamps hold the edges of the film as it is being stretched. In order to accurately achieve the desired stretching, it is necessary to provide accurate guidance of the tenter clamps along the guide rails.

German Patent 2,558,765 discloses a film stretching machine including a tenter frame for continuously processing web-shaped goods such as film webs. The tenter frame includes a respective guide rail for guiding the tenter clamps arranged respectively along both edges of the web. Each guide rail is arranged along the respective edge of the material web, and comprises a packet of individual spring steel bands stacked together, with the major plane of the spring steel bands oriented perpendicular to the major plane of the material web. For example, in the usual case, the material web extends on a horizontal plane, and the width dimension of the packet of spring steel bands extends in a vertical plane. The tenter clamps are provided with pairs of guide rollers that roll along the vertical surfaces of the steel bands for horizontally guiding the tenter clamps, and support rollers that guidedly roll along the upper and lower edges of the spring steel bands for vertically guiding the tenter clamps.

Due to manufacturing tolerances or operating wear of the tenter clamps, such as deviating axis spacings between the vertically arranged guide roller axes for example, and due to manufacturing tolerances in the thickness of the rolled spring steel bands forming the prior art guide rail, a certain amount of play typically exists between the guide roller pairs and the conventional guide rail. As a result of this play, the guide rollers and the lower support roller of the tenter clamps do not always constantly and uniformly contact the guide rail (while the upper support roller is expected to stay in constant contact with the upper edge of the guide rail under the constant influence of the weight of the tenter clamps and the film web). Due to such intermittent contact, the guide rollers and the lower support roller do not rotate constantly and uniformly. Depending on the loading conditions and the guidance of the tenter clamps during the film stretching process, i.e. as the guide rollers move along the guide rails in the web advance direction, either the first guide roller or the second guide roller of each guide roller pair will alternatingly come into contact with the guide rail.

When a respective guide roller is lifted away from or out of contact with the guide rail, it slows down or even completely stops spinning. Then, when this guide roller again comes into contact with the guide rail, it must very quickly accelerate its rotation so that the circumferential speed matches the linear travel velocity of the tenter chain, i.e. the circumferential velocity of the other operative guide rollers. The resulting alternating loading of the guide rollers, the tenter clamps, and the tenter chains, and the associated repetitive deceleration and acceleration of the guide rollers have disadvantageous effects on the guide rail and on the guide rollers themselves. Most significantly, this results in mechanical damage and wear of the outer spring steel bands of the guide rail and of the outer circumference of the guide rollers, especially in the most serious case in which a guide roller slides rather than rolls against the guide rail, dependent on the internal friction of the guide roller bearings and of the seals thereof. Once the guide rail has grooves worn therein, or a respective guide roller is worn out-of-round, the wearing damage becomes ever greater.

Even before such drastic mechanical damage results, the guide rollers and the guide roller bearings are disadvantageously heated to rather high temperatures due to the frictional heating arising from the intermittent roller accelerations and the associated resultant sliding motion, in addition to the relatively high temperatures inherently existing in the heated region of the stretching machine. As a result, the operation of the overall tenter chain is not as smooth, and the various components have a reduced operating life span.

German Patent Laying-Open Document 19,515,036 discloses guide rails for guiding tenter clamps of a stretching apparatus, which aim to provide an improved tenter clamp guidance so as to achieve an improved reliability and operating life span of the stretching apparatus. More specifically, the reference discloses a system which aims to ensure a continuous contact of the guide rollers on a guide rail, while taking into account or compensating for dimensional tolerances and variations, by making the spacing distance respectively between the horizontal guide surfaces or the vertical guide surfaces variable in a certain limited range. The guide rail includes at least one guide surface member that is mounted or held on a pre-stressing and/or damping arrangement so that this guide surface has a yielding variable position rather than a fixed position relative to the rest of the guide rail. The pre-stressing and/or damping arrangement may include springs and/or dampers such as elastomeric springs, gas dampers or hydraulic dampers, or damper-spring combinations.

As shown in FIGS. 3 and 5 to 10, the German reference 19,515,036 discloses various arrangements of spring and/or damper members between guide surface members of the guide rail. In each one of the disclosed arrangements, complicated measures are required for incorporating the spring and/or damper into the guide rail. As a result of these complicated measures, the known arrangement involves a rather high manufacturing and installation effort and expense. Moreover, the disclosed spring arrangements do not achieve optimum functionality. For example, the corrugated or wave-spring members shown in FIGS. 9 and 10 of the reference have alternating wave corrugations along the length of the guide rail, which suffer the following problems. First, a uniform elastic force is not applied continuously along the length of the guide rail, because the wave-spring members only contact the guide surface members at spaced-apart locations. Secondly, during operation, when the guide surface members are elastically pressed together between the guide roller pairs and the wave-spring members are consequently pressed flatter, as a result the wave-spring members necessarily get longer in the lengthwise direction of the guide rail. The lengthening effect is additive over the entire length of the spring member, so that the ends of the spring member must be free to undergo significant sliding or repositioning. This results in the need for complicated mounting measures to loosely hold the spring members in place, and can be prohibitive of long guide rail systems.

Another possible approach would be to embody the guide rollers or the guide roller bearing arrangements in an elastically yielding manner so as to compensate for any tolerances between the guide rollers and the guide rails. Such arrangements would be rather complicated and costly, because each guide roller or each guide roller set provided on each individual tenter clamp must be individually elastically yieldably supported.

SUMMARY OF THE INVENTION

In view of the above, it is an object of the invention to provide a guide rail for guiding tenter clamps or the like, especially in film stretching machines, in which any play between the guide roller pairs of the tenter clamps and the guide rail surfaces can be compensated, and thereby a constant contact of the guide rollers on the guide rail surfaces can be achieved, with simple and inexpensive structural measures. The invention further aims to overcome or avoid the disadvantages of the prior art, and to achieve additional advantages, as apparent from the present description.

The above objects have been achieved according to the invention in a guide rail for guiding the tenter clamps in tentering machines, and especially film stretching machines, wherein the guide rail comprises inner and outer spring steel bands that have a uniform band width along their length, and that are mounted on support members of the film stretching machine which extend perpendicularly to the lengthwise extension direction of the spring steel bands. Furthermore, particularly according to the invention, the guide rail additionally comprises a spring elastic member in the form of a spring steel band that has a spring elasticity in a direction perpendicular to the lengthwise extension of the guide rail. The inventive guide rail may simply consist of a plurality of spring steel bands stacked adjacent one another, whereby at least one of the spring steel bands has a slight curvature about an axis extending parallel to the length of the guide rail. This curvature or cupping of at least one of the spring steel bands provides an elastic yielding of the guide rail in a direction perpendicular to the guide surfaces, i.e. the horizontal spacing distance between the vertical guide surfaces of the guide rail is elastically yieldably variable. The one or more curved or cupped spring steel bands may be arranged internally between or externally relative to flat, non-cupped spring steel bands.

The above objects have further been achieved according to the invention in a guide rail comprising at least inner and outer spring steel bands, and a spacer member arranged between the inner and outer spring steel bands. The spacer member has a smaller width than the width of the inner and outer spring steel bands, for example in the vertical direction. As a result, free ends of the spring steel bands protrude, for example vertically, beyond the spacer member. The spring steel bands are elastically flexible, so that the protruding free ends can yield elastically in the direction of the guiding contact support, for example in a horizontal direction.

The invention further provides a tentering machine, and especially a film stretching machine for biaxially stretching thermoplastic films. The machine comprises a guide rail according to the invention, as described herein, as well as tenter clamps including first and second pairs of upper guide rollers and first and second pairs of lower guide rollers rolling along the guide rail for horizontally guiding the tenter clamps, and at least one support roller rolling along the guide rail to provide vertical guidance for the tenter clamps. According to the invention, a permanent continuous contact is achieved between the guide rollers and the guide rail and between the support rollers and the guide rail.

While it is generally known in the prior art to construct guide rails of a plurality of adjacently arranged spring steel bands clamped together, the invention has provided a simple modification of one or more of the spring steel bands in order to achieve a certain elastic spring action or yielding resilience in the width of the resultant guide rail. This is achieved simply by embodying at least one of the spring steel bands of the guide rail as a spring elastic component along its length, such that its thickness dimension is spring elastically yieldable. As a result, the other spring steel bands of the guide rail, and the overall thickness of the guide rail, are also yieldable in the thickness direction. Consequently, the guide rolls for horizontally guiding the tenter clamps remain constantly and elastically yieldingly in contact with the outer spring steel bands of the guide rail, independently of the respective loading condition of the tenter clamp. The spring elastic characteristic of the guide rail effectively compensates for any production tolerances or wear-induced tolerances, for example a deviation in the axis spacing between the vertical axes of the guide rollers of a given guide roller pair.

The invention achieves a longer operating life of the guide rollers of the tenter clamps, and also a longer operating life of at least the outer spring steel bands of the guide rails that come in contact with the guide rollers. The invention also achieves a much simpler and less costly means for achieving this result than any of the above discussed prior art.

BRIEF DESCRIPTION OF THE DRAWINGS

In order that the invention may be clearly understood, it will now be described, in connection with example embodiments of the invention, with reference to the drawings, wherein:

FIG. 8 is a schematic sectional view of another embodiment of a guide rail according to the invention incorporating a spacer member arranged symmetrically between spring steel bands; and FIG. 9 is a schematic sectional view of a roller set of a tenter clamp rolling along a guide rail according to a variant of FIG. 8 in which the spacer member is arranged asymmetrically between spring steel bands.

DETAILED DESCRIPTION OF PREFERRED EXAMPLE EMBODIMENTS AND OF THE BEST MODE OF THE INVENTION

Figure 1:
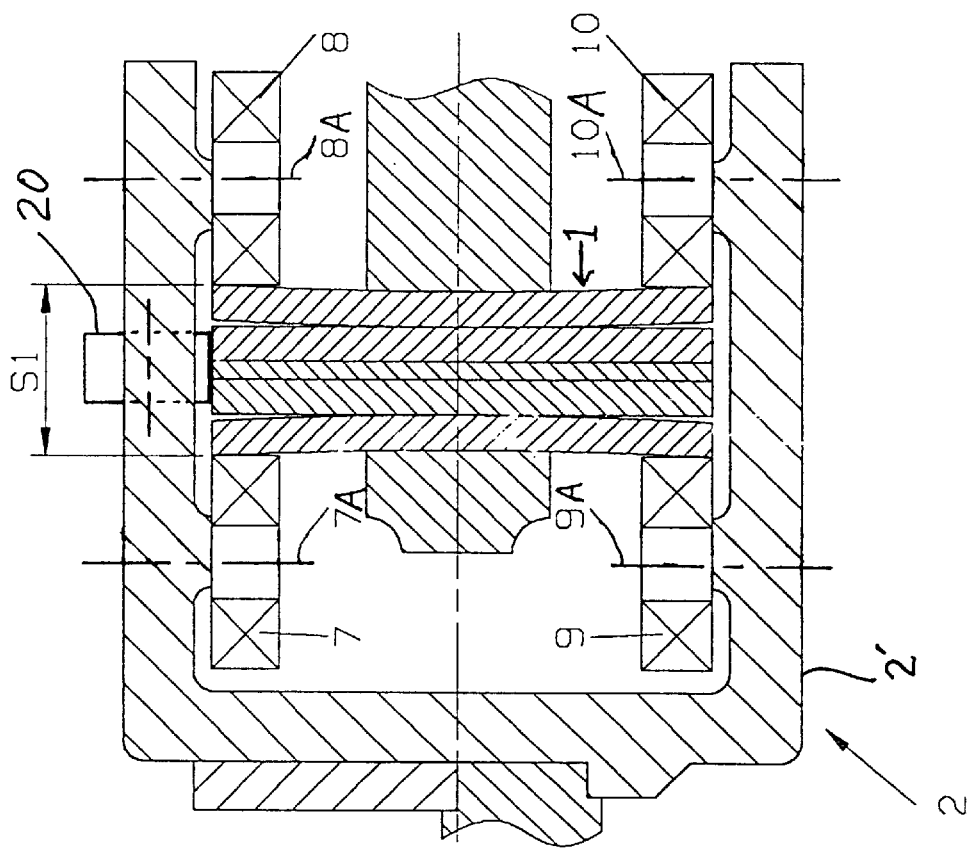
FIG. 1 is a schematic sectional view of a first embodiment of a guide rail comprising outer spring elastic components according to the invention.

In the embodiment shown in FIG. 1, a guide rail 1 consists essentially of five spring steel bands 1A, 1B, 1C, 1B and 1A, which are stacked together next to one another and clampingly held between a support member 3 that is rigidly fixed to or mounted on the stretching machine and a clamping member 4 by means of a connector element such as a clamping bolt 5. The centrally arranged spring steel band 1C and the two inner spring steel bands 1B are substantially flat, planar band members extending with their lengthwise direction perpendicularly to the plane of the drawing figure. The two outer spring steel bands 1A are not flat planar band members, but rather are pre-curved or pre-configured to have a curved or cupped cross-section at rest, with a uniform curvature along the length of the band, and with a concave surface on one side and a convex surface on the opposite side.

The curvature of the bands 1A is preferably a cylindrical curvature about an imaginary axis of curvature extending parallel to the lengthwise axis of the band, whereby the concave curvature has a radius R (see e.g. FIG. 4), which may be in the range from approximately 3000 mm to approximately 6000 mm, for example. Instead of being cylindrical with a constant radius, the curve could be flatter than cylindrical, or hyperbolic, or parabolic, for example. It is well understood by those of ordinary skill in the art how to achieve the required degree of set curvature by appropriate bending and heat treatment of a flat spring steel band starting material.

The two outer spring steel bands 1A are respectively arranged with their concave curvatures facing outwardly in opposite directions in the embodiment of FIG. 1. As a result, once all five steel bands are clamped together, the free edge portions of the curved steel bands 1A protruding out of the clamping zone between the clamping member 4 and the support member 3 curve laterally outwardly away from the flat planar steel bands 1B, 1C and 1B. In this resting or unstressed condition, the horizontal thickness S of the guide rail 1 at the upper and lower free edges of the steel bands is greater than the clamped thickness S2 of the steel bands directly in the vicinity of the clamping bolt 5, to the extent of S–S2. This difference S–S2 defines the total range in which the guide rail may yield elastically to compensate for any tolerances or deviations in the arrangement and running operation of the guide rollers that are to be rollingly guided with constant contact along the vertical side faces of the guide rail 1, as will now be described with reference to FIG. 2.

Figure 2:
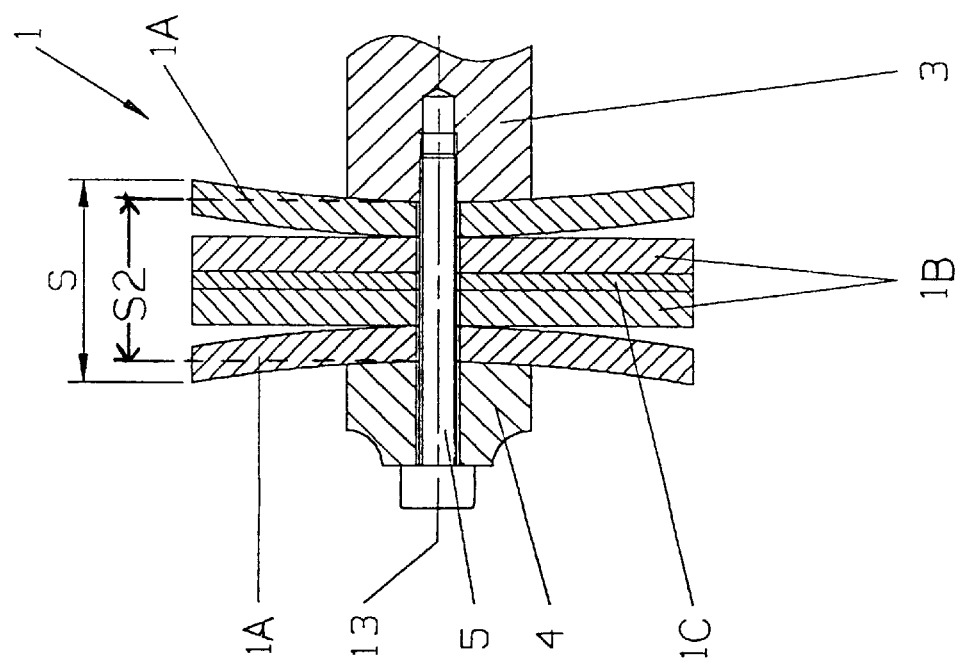
FIG. 2 is a schematic sectional view showing the guide roller set of a tenter clamp rolling along the guide rail according to FIG. 1.

FIG. 2 shows a roller set 2' of a tenter clamp device 2 including upper pairs of guide rollers 7 and 8 and lower pairs of guide rollers 9 and 10 (whereby only one roller of each pair is visible in the drawing) arranged to roll along the vertical side faces of the guide rail 1, and a support roller 20 arranged to roll supportingly along a top edge of the guide rail 1. For the sake of clarity, the rest of the tenter frame and the tenter clamps, clips or hooks themselves are not shown in FIG. 2. The roller set 2' is arranged on the guide rail 1 with the curved outer steel bands 1A of the guide rail partially elastically squeezed together between the respective roller pairs 7, 8 and 9, 10, which respectively have a spacing S1 between the respective roller surfaces of each pair. Thus, the initial resting width S of the guide rail 1 is elastically reduced or squeezed down to the narrower width S1 between the respective roller pairs 7, 8 and 9, 10, whereby the operating spacing S1 is greater than the completely clamped width S2, but less than the free resting width S. Consequently, the curved outer steel bands 1A are able to yield elastically both inwardly and outwardly as needed to compensate for any tolerances or deviations in the arrangement and operation of the rollers 7, 8, 9, 10. Thus, each of the rollers 7, 8, 9 and 10 will constantly be in contact with the respective adjacent vertical guide surface of the guide rail 1, despite and independent of any tolerances or deviations. Such tolerances, for example include deviations from the nominal value in the spacing distance between the roller axes 7A and 8A or between the roller axes 9A and 10A.

Figure 3:
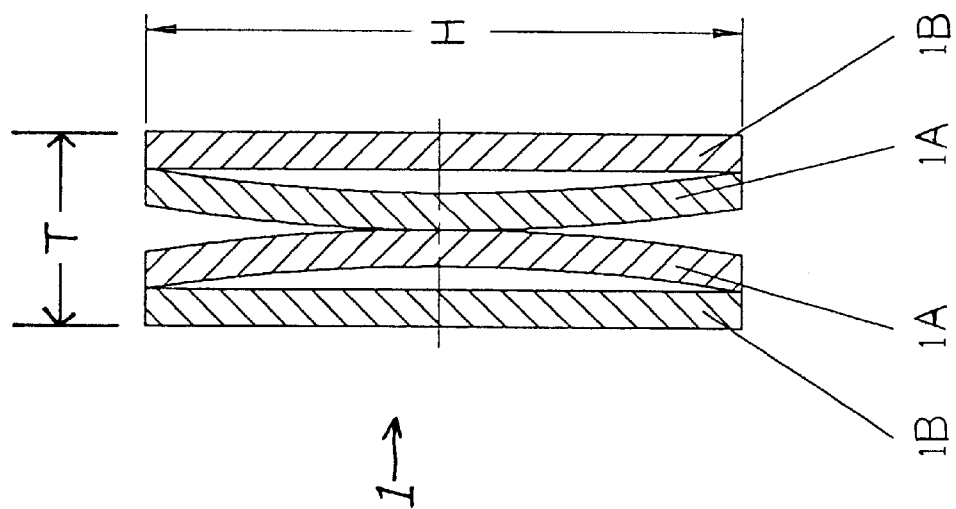
FIG. 3 is a schematic sectional view of another embodiment of a guide rail according to the invention, having inner spring elastic components.

FIG. 3 shows an alternative embodiment of a guide rail 1, comprising four spring steel bands 1B, 1A, 1A and 1B, whereby the outer steel bands 1B are substantially flat planar bands while the two inner steel bands 1A are embodied as elastic spring components having a pre-induced curvature. The curved inner steel bands 1A are arranged with the concave curvature respectively facing outward. As a result, the flat outer steel bands 1B are spring-elastically supported so as to be elastically deflectable in the thickness dimension T. The resultant spring characteristic is greater in the embodiment of FIG. 3 than in the embodiment of FIG. 1. It should be understood that in the present embodiment of FIG. 3, the clamping member 4 can be adjusted by means of the clamping bolt 5 to provide the desired thickness T, without completely clamping together the steel bands 1B, 1A, 1A and 1B in the central clamping zone thereof at which the clamping bolt 5 passes through the guide rail 1. It should further be noted in the embodiments of FIGS. 1 and 3, that all of the steel bands preferably have substantially the same height in the vertical direction corresponding to the height H of the guide rail 1. The resting height of the curved steel bands 1A may be very slightly less than that of the flat steel bands 1B and 1C, to allow for a slight height increase of the curved bands 1A as the curved bands are elastically compressed.

Figure 4:
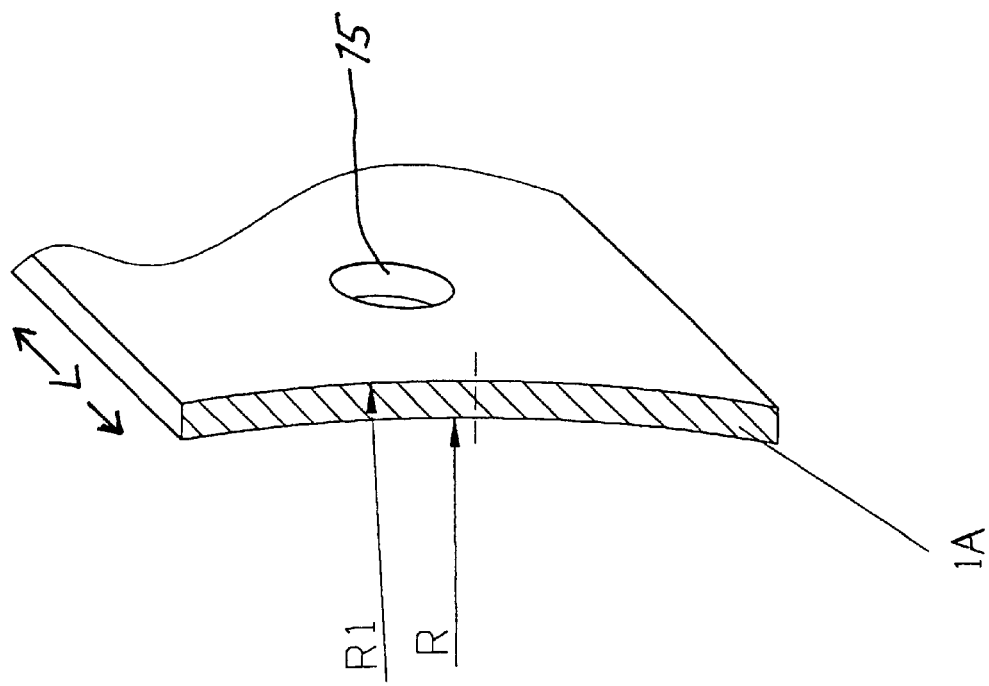
FIG. 4 is a sectioned partial perspective view of a single spring steel band that is curved or cupped to form a spring elastic component.

FIG. 4 shows a single curved or cupped spring steel band 1A suitable for use in the arrangements of FIGS. 1, 3, 5 and 6. The curved steel band 1A has a uniform cylindrical curvature extending along the length L of the steel band 1A, and having an inner concave radius of curvature R and an outer radius of curvature R1. The inner radius of curvature R is preferably in the range of about 3000 mm to about 6000 mm, while the outer radius of curvature R1 is substantially equal to the inner radius of curvature R plus the thickness of the individual steel band 1A. As shown in the steel band 1A in FIG. 4, all of the steel bands have a respective hole 15 provided along a mid-line of the band, for passing each respective clamping bolt 5 therethrough. The hole 15 may be a circular hole just large enough to allow convenient clearance of the bolt 5, and does not need to be an elongated slot hole for example. While each curved band 1A will expand slightly to a greater height when it is elastically flattened, i.e. when the curvature is elastically reduced, the band 1A does not need any play radially around the bolts 5, because the bolts 5 pass through the static mid-line of the band 1A, and because the length of the band 1A does not change (unlike in the above discussed prior art).

Figure 6:
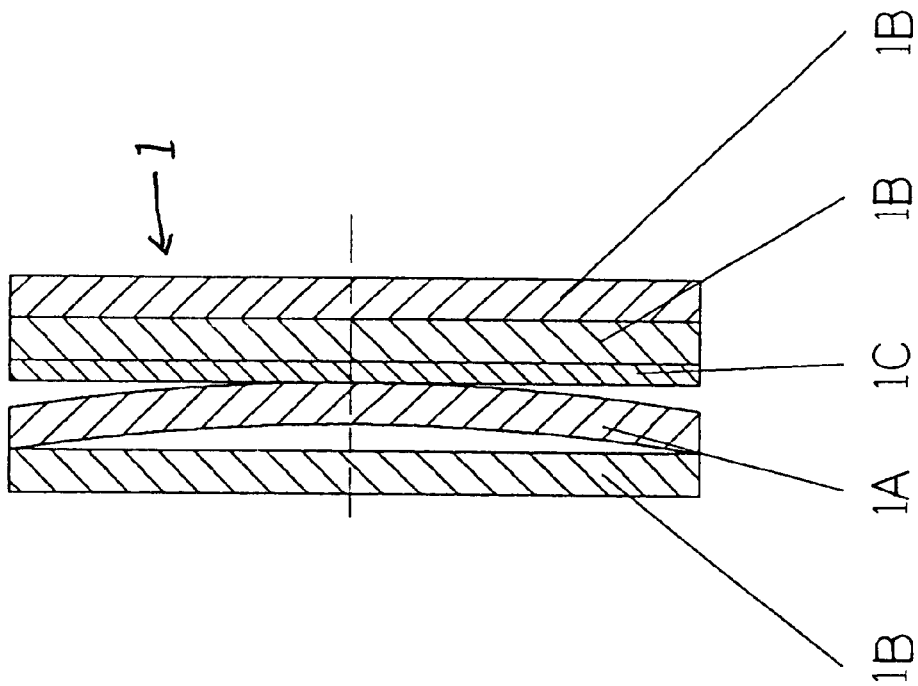
FIG. 6 is a schematic sectional view of another embodiment of a guide rail comprising a single internally arranged spring steel band as an elastic component.
Figure 5:
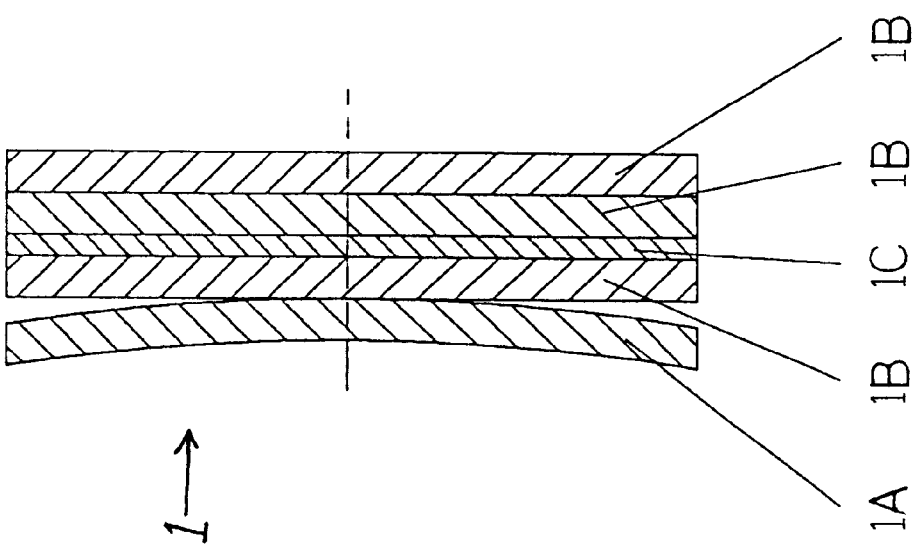
FIG. 5 is a schematic sectional view of another embodiment of a guide rail including a single outer spring steel band as a spring elastic component.

FIGS. 5 and 6 respectively show two further modified embodiments with different arrangements and numbers of spring steel bands. The embodiment of FIG. 5 includes a single curved steel band 1A arranged as an outer band on one side of the guide rail 1, while the embodiment of FIG. 6 includes a single curved steel band 1A arranged internally between flat outer bands 1B. In both FIG. 5 and FIG. 6, the arrangement includes three thicker flat steel bands 1B and one thinner or shim steel band 1C stacked together to provide the desired finished thickness and mechanical strength of the guide rail 1. Once the nominal spacing between the guide rollers and the degree of tolerance or variation in this spacing in a particular tentering machine is known, it is a simple matter to arrange one or more pre-curved steel bands 1A together with one or more flat steel bands 1B and/or 1C as needed to achieve the desired nominal operating thickness and the degree of elastic yielding compensation in the installed guide rail 1.

Figure 7:
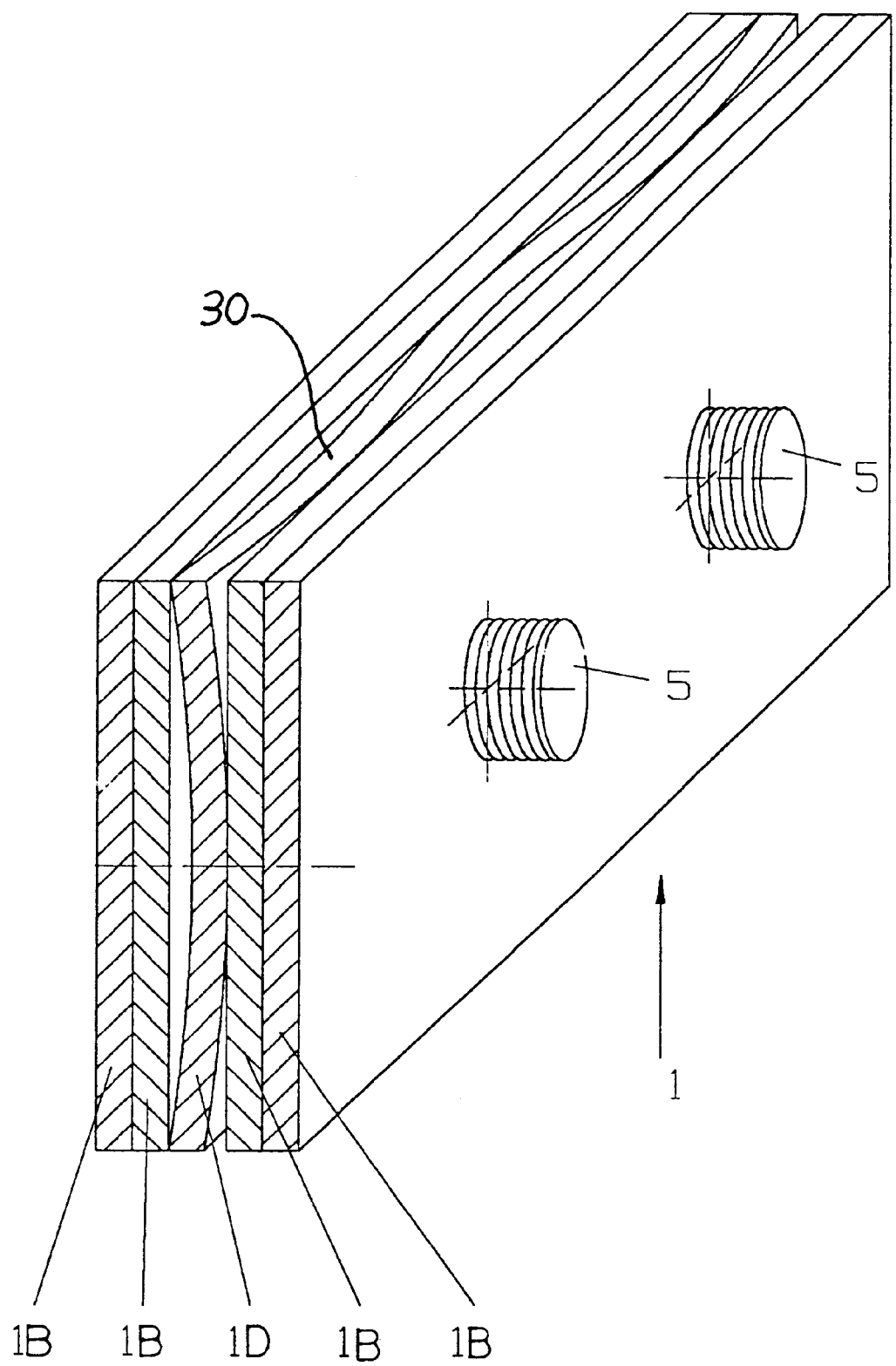
FIG. 7 is a sectioned perspective view of another embodiment of a guide rail including a single internally arranged spring elastic component in the form of a spring steel band having two types or degrees of curvature.

FIG. 7 shows another embodiment of a guide rail 1 including a further variant of a pre-curved spring steel band member. Specifically, the guide rail 1 according to FIG. 7 includes a spring elastic member or pre-curved steel band 1D arranged between two respective pairs of flat planar steel bands 1B. The curved steel band 1D has two degrees of curvature rather than the single degree of curvature provided in the curved steel bands 1A discussed above. Namely, the curved steel band 1D has a first curvature about an imaginary axis of curvature extending parallel to the lengthwise axis of the guide rail 1, and a second curvature 30 about one or more imaginary axes parallel to the height of the guide rail 1.

Thus, the curvature is not uniform along the length of the steel band 1D. Instead, as can be seen in FIG. 7, the upper and lower free edges of the steel band 1D comprise a sinusoidal varying curvature or undulation 30, while the first degree of curvature evident in the vertical sectional plane of FIG. 7 can vary sinusoidally from concave to flat or even from concave to convex along the length of the steel band 1D correspondingly with the sinusoidal undulation along the free edges thereof. In two particular variations, the sinusoidal undulations extending respectively along the top and bottom edges of the steel band 1D can be either in phase with each other or directly out of phase relative to each other. The resulting spring stiffness coefficient and the maximum spring deflection of the curved steel band 1D can be strongly influenced and adjusted to achieve the specific results needed by varying the thickness of the steel band 1D as well as the amplitude and the number of the sinusoidal curves provided per unit length of the steel band.

Once again in this embodiment, the clamping bolts 5 must be adjusted so as not to completely clamp together the various steel bands, but rather to allow the desired deflectable thickness. For this purpose, the steel bands all have sufficiently large clearance holes 15 bored therethrough, to allow the steel bands to slide along the clamping bolts 5.

FIG. 8 shows another embodiment of a guide rail 1' according to the invention. The guide rail 1' once again comprises a plurality of flat planar spring steel bands 1B, specifically four of such flat bands 1B. However, the guide rail 1' does not include a curved spring steel band 1A or 1D, but instead includes a spacer member 6 symmetrically arranged between the two pairs of flat bands 1B. As described above, the guide rail 1' is clampingly held between a support member 3 and a clamping member 4 by a connector element or clamping bolt 5. The spacer member 6 has a thickness d, while the complete guide rail 1' has a total thickness S when it is unstressed or at rest as shown in FIG. 8. The spacer member 6 has a height h that is less than the height H of the spring steel bands 1B, so that free protruding edge portions F of the steel bands 1B remain unclamped and elastically deflectable into the spacing gap having the thickness d between the respective pairs of steel bands 1B. The spacer member may simply be another flat spring steel band having a smaller width or height h than the width or height H of the steel bands 1B.

When a tenter clamp 2 is mounted on the guide rail 1' as shown in FIG. 9, the rollers 7 and 8 and the rollers 9 and 10 respectively have spacings S1 therebetween less than the unstressed thickness S of the guide rail 1'. As a result, the originally flat spring steel bands 1B are squeezed together while reducing the gap between the outer free edge portions to the distance d1. In this manner, the total thickness of the guide rail 1' may yield or adjust elastically, either inwardly to the extent of the spacing gap d1, or outwardly to the extent of the difference d–d1 or S–S1, in order to compensate for any tolerances or deviations in the arrangement or the operation of the rollers 7, 8, 9 and 10 of the tenter clamps 2. Since the nominal spacing S1 between the respective rollers 7 and 8 or 9 and 10 is smaller than the nominal resting thickness S of the guide rail 1', the guide rail 1' exerts a constant outward urging compensation force in the direction of arrows 12 onto the guide rollers 7, 8, 9 and 10. This effect ensures that the guide rollers remain constantly in contact with the guide rail. By appropriately selecting the thickness d and the height h of the spacer member 6, in connection with the thickness, height and number of flat steel bands 1B, the spring characteristic of the overall guide rail 1' may simply and directly be adjusted as needed.

It should be noted in FIG. 9 that the spacer member 6 is arranged asymmetrically between three steel bands on one side and one steel band on the other side, in comparison to the symmetrical arrangement in FIG. 8. This is another manner in which the overall spring characteristic can easily be adjusted. Moreover, such an arrangement is preferable when the predominant force applied by the tenter clamp 2 is in one direction as indicated by the arrows 12'. This is, of course, the situation in a stretching process in which the stretching tension forces must all be taken up in the tenter clamps 2. Therefore, since most of the forces will be transmitted through the rollers 8 and 10 into the right side surface of the guide rail 1', it is advantageous to use three steel bands 1B together on the right side of the guide rail 1' to better take up and counteract the applied tension forces. A lesser compensating force is exerted by the single steel band 1B on the left side of the guide rail 1' against the counter rollers 7 and 9. This feature also applies to the arrangement shown in FIG. 5, which similarly can better withstand and counteract the applied tension forces than the arrangement in FIG. 1, for example.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A guide rail arrangement adapted to guidingly support tenter clamps in a tentering machine, comprising a mounting clamp and a guide rail clampedly held by said mounting clamp, wherein said guide rail comprises a plurality of spring steel bands stacked adjacent one another to form a stack of said steel bands, wherein said spring steel bands include at least one pre-curved steel band having a curvature in a section plane perpendicular to a lengthwise axis of said pre-curved steel band, and wherein said curvature of said pre-curved steel band is elastically yieldable in a direction perpendicular to said lengthwise axis.

2. The guide rail arrangement of claim 1, wherein all of said spring steel bands have substantially the same width between edges thereof, and wherein said width is constant over a length of said bands.

3. The guide rail arrangement of claim 1, wherein said curvature of said pre-curved steel band is uniform and continuous along a length of said pre-curved steel band, such that said pre-curved steel band has a concavely curved surface and a convexly curved surface extending uniformly along said length.

4. The guide rail arrangement of claim 3, wherein said curvature is a cylindrical curvature about an axis of curvature extending parallel to said lengthwise axis of said pre-curved steel band.

5. The guide rail arrangement of claim 4, wherein said concavely curved surface has a radius of curvature about said axis of curvature of at least 3000 mm.

6. The guide rail arrangement of claim 1, wherein said pre-curved steel band further has sinusoidal undulations along opposite edges thereof, in addition to said curvature in said section plane.

7. The guide rail arrangement of claim 6, wherein said sinusoidal undulations respectively along said opposite edges are in phase with each other.

8. The guide rail arrangement of claim 6, wherein said sinusoidal undulations respectively along said opposite edges are opposite in phase relative to each other.

9. The guide rail arrangement of claim 6, wherein said curvature varies in phase with said sinusoidal undulations along a length of said pre-curved steel band.

10. The guide rail arrangement of claim 1, wherein said spring steel bands further include at least one flat planar steel band, and wherein said pre-curved steel band is arranged as an outer one of said spring steel bands in said stack forming an outer guide surface of said guide rail adapted to have guide rollers of the tenter clamps roll therealong.

11. The guide rail arrangement of claim 10, wherein said spring steel bands include two of said pre-curved steel bands arranged as respective opposite outer steel bands in said stack forming respective opposite ones of said outer guide surface of said guide rail, with said at least one flat planar steel band arranged between said two pre-curved steel bands.

12. The guide rail arrangement of claim 10, wherein said spring steel bands include only one of said pre-curved steel band forming only one said outer guide surface, and wherein said at least one flat planar steel band forms a second outer guide surface opposite said only one outer guide surface.

13. The guide rail arrangement of claim 1, wherein said spring steel bands further include at least two flat planar steel bands respectively arranged at opposite outer sides of said stack so as to form respective opposite outer guide surfaces of said guide rail adapted to have guide rollers of the tenter clamps roll therealong, and wherein said pre-curved steel band is arranged as an inner one of said steel bands between said flat planar steel bands.

14. The guide rail arrangement of claim 13, wherein said spring steel bands include two of said pre-curved steel band arranged between said flat planar steel bands.

15. The guide rail arrangement of claim 13, wherein said stack is symmetrical about said at least one pre-curved steel band, with said at least one pre-curved steel band arranged at a center of a thickness of said stack.

16. The guide rail arrangement of claim 13, wherein said stack is asymmetrical about a center of a thickness of said stack, with said at least one pre-curved steel band arranged offset from said center of said thickness.

17. The guide rail arrangement of claim 1, wherein said mounting clamp comprises a clamping block, a counter support, and a clamping bolt connecting said clamping block to said counter support, wherein said stack of said steel bands is arranged and clampedly held between said clamping block and said counter support, and wherein each of said spring steel bands has a respective hole therein and said bolt is arranged passing through said hole of each said spring steel band.

18. The guide rail arrangement of claim 17, wherein each said hole is a circular hole.

19. The guide rail arrangement of claim 17, wherein said clamping bolt is tightened to an extent such that a spacing between said clamping block and said counter support is less than a maximum thickness of said stack of steel bands in an unstressed condition, and such that said pre-curved steel band is elastically pre-stressed by reducing said curvature.

20. The guide rail arrangement of claim 1, wherein said guide rail consists of said plurality of spring steel bands.

21. A guide rail arrangement adapted to guidingly support tenter clamps in a tentering machine, comprising a mounting clamp and a guide rail clampedly held by said mounting clamp, wherein said guide rail comprises a plurality of spring steel bands arranged parallel and adjacent to one another and a spacer member arranged between two respective adjacent ones of said steel bands so as to form a spacing gap between free protruding edge portions of said adjacent steel bands, and wherein said free protruding edge portions of said adjacent steel bands are elastically flexible so as to be elastically deflectable into said spacing gap.

22. The guide rail arrangement of claim 21, wherein all of said spring steel bands have substantially the same width between edges thereof, and wherein said width is constant over a length of said bands.

23. The guide rail arrangement of claim 21, wherein said spacer member has a smaller edge-to-edge width than said spring steel bands.

24. The guide rail arrangement of claim 21, wherein said spacer member is arranged symmetrically between said spring steel bands.

25. The guide rail arrangement of claim 21, wherein said spacer member is arranged asymmetrically between said spring steel bands.

26. In a tentering machine having a guide rail and tenter clamps which each respectively include at least two upper guide rollers arranged to respectively roll along opposite side surfaces of the guide rail and at least two lower guide rollers arranged to respectively roll along the opposite side surfaces of the guide rail to horizontally guide the tenter clamps, and at least one support roller arranged to roll along an edge of the guide rail to vertically guide the tenter clamps, an improved guide rail arrangement comprising a mounting clamp and said guide rail clampedly held and connected to said machine by said mounting clamp, wherein said guide rail comprises a plurality of flat planar spring steel bands and either a pre-curved steel band having a curvature in a section plane perpendicular to a lengthwise axis of said pre-curved steel band stacked with said flat planar spring steel bands, or a spacer member arranged between two respective adjacent ones of said flat planar spring steel bands so as to form a spacing gap between free protruding edge portions of said adjacent steel bands, and wherein all of said guide rollers respectively remain constantly in contact with said respective opposite side surfaces of said guide rail.

* * * * *